(12) United States Patent
Lewis et al.

(10) Patent No.: US 9,264,229 B1
(45) Date of Patent: *Feb. 16, 2016

(54) SYSTEM AND METHOD FOR GENERATING RANDOM KEY STREAM CIPHER TEXTS

(71) Applicant: Elliptic Technologies Inc., Kanata (CA)

(72) Inventors: Michael James Lewis, Ottawa (CA); Neil Leckett, Ottawa (CA); A. A. Jithra Adikari, Ottawa (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/639,601

(22) Filed: Mar. 5, 2015

Related U.S. Application Data

(63) Continuation-in-part of application No. 14/339,576, filed on Jul. 24, 2014, now Pat. No. 9,008,313.

(51) Int. Cl.
*H04L 9/00* (2006.01)
*H04L 9/08* (2006.01)
*G06F 21/60* (2013.01)

(52) U.S. Cl.
CPC .............. *H04L 9/0869* (2013.01); *G06F 21/60* (2013.01); *H04L 9/0861* (2013.01); *G06F 2211/007* (2013.01); *H04L 2209/24* (2013.01)

(58) Field of Classification Search
CPC ........................ H04W 12/11; G06F 2211/007
USPC .............. 380/259–264, 36–30; 713/160–167, 713/189–194
See application file for complete search history.

(56) References Cited

U.S. PATENT DOCUMENTS

| | | | |
|---|---|---|---|
| 6,880,050 B1* | 4/2005 | Korger | 711/156 |
| 8,417,982 B1* | 4/2013 | Amit et al. | 713/400 |
| 8,750,498 B1 | 6/2014 | Poo | |
| 2003/0198345 A1 | 10/2003 | Van Buer | |
| 2006/0126835 A1 | 6/2006 | Kim | |
| 2006/0236102 A1 | 10/2006 | Golic | |
| 2010/0250965 A1 | 9/2010 | Olsen | |

OTHER PUBLICATIONS

International Search Report, PCT/IB2014/001385, 3 pages, date of mailing Mar. 23, 2015.
International Written Opinion, PCT/IB2014/001385, 3 pages, date of mailing Mar. 23, 2015.

* cited by examiner

*Primary Examiner* — Madhuri Herzog

(57) ABSTRACT

A method for performing a cryptographic function on text to generate converted text comprises producing a random key stream having a first block size in a first frequency domain; converting the random key stream having a first block size in the first frequency domain to a random key stream in a second frequency domain; converting the random key stream having the first block size in the second frequency domain into smaller block sizes, thereby producing smaller block-sized random key stream of the second frequency domain; and converting the text using the smaller block-sized random key stream of the second frequency domain to produce the converted text. The frequency in the first frequency domain is preferably lower than the frequency in the second frequency domain.

7 Claims, 2 Drawing Sheets

SYSTEM AND METHOD FOR GENERATING RANDOM KEY STREAM CIPHER TEXTS

CROSS REFERENCE TO RELATED APPLICATIONS

This application is a continuation-in-part and claims priority to U.S. patent application Ser. No. 14/339,576, filed Jul. 24, 2014, now allowed, which is hereby incorporated by reference in its entirety.

FIELD OF THE INVENTION

The present disclosure relates to the field of generating random key stream cipher texts with smaller block sizes of higher frequency.

BACKGROUND

In the field of cryptography, a key stream is a stream of characters that are combined with a plain text message to produce an encrypted message, known as the cipher text. The characters that are combined with the plain text message may be random or pseudorandom characters, such as bits, bytes, numbers or actual characters like A-Z depending on the usage case.

The Advanced Encryption Standard (AES) is a block cipher logic specification for the encryption of electronic data established by the U.S. National Institute of Standards and Technology (NIST). Generally, an Advanced Encryption Standard (AES) engine has a long critical path. The critical path may be regarded as the path that takes the longest time in a combinational logic system for information to navigate through. As a result AES engines having longer critical paths cannot be run at a higher clock frequency. Further, AES engines are set to deliver large block size cipher texts, usually set at 128 bits. Therefore, the output from AES engines are of large block sizes with lower frequency.

In some applications, however, there is a requirement for smaller block size cipher texts that are of a higher frequency. Existing solutions do not allow the production of small block size cipher texts at a higher frequency.

This background information is provided to reveal information believed by the applicant to be of possible relevance to the present invention. No admission is necessarily intended, nor should be construed, that any of the preceding information constitutes prior art against the present invention.

SUMMARY

In accordance with one embodiment, a method for performing a cryptographic function on text to generate converted text, the method comprises producing a random key stream having a first block size in a first frequency domain; converting the random key stream having a first block size in the first frequency domain to a random key stream in a second frequency domain; converting the random key stream having the first block size in the second frequency domain into smaller block sizes, thereby producing smaller block-sized random key stream of the second frequency domain; and converting the text using the smaller block-sized random key stream of the second frequency domain to produce the converted text.

In one implementation, the cryptographic function is encryption, text is plain text and the converted text is cipher text. In another implementation, the cryptographic function is decryption, and the text is cipher text and the converted text is plain text. The frequency in the first frequency domain is preferably lower than the frequency in the second frequency domain. The converting of the random key stream in the first frequency domain to a random key stream in a second frequency domain may be effected by a dual clock domain FIFO. The converting of the random key stream having the first block size in the second frequency domain into smaller block sizes may be effected by storing the random key stream in the second frequency domain in a register, and scanning the register to generate smaller block-size random key stream.

In accordance with another embodiment, a cryptographic system comprises a random key stream generator generating a random key stream having a first block size in a first frequency domain; a dual clock domain FIFO that converts the random key stream in the first frequency domain to a random key stream in a second frequency domain; at least one register and at least one multiplexer that convert the random key stream having the first block size in the second frequency domain into smaller block sizes, thereby producing a smaller block-sized random key stream of the second frequency domain; and a cryptographic function that converts text using the smaller block-sized random key stream of the second frequency domain into converted text.

In one implementation, the cryptographic function is an encryption function, the text is plain text and the converted text is cipher text. In another implementation, the cryptographic function is an decryption function, the text is cipher text and the converted text is plain text. The frequency in the first frequency domain is preferably lower than the frequency in the second frequency domain. The system may include small-sized registers that convert the random key stream having the first block size in the second frequency domain into smaller block sizes.

BRIEF DESCRIPTION OF THE DRAWINGS

The foregoing and other advantages of the invention will become apparent upon reading the following detailed description and upon reference to the drawings, in which.

Figure 1:
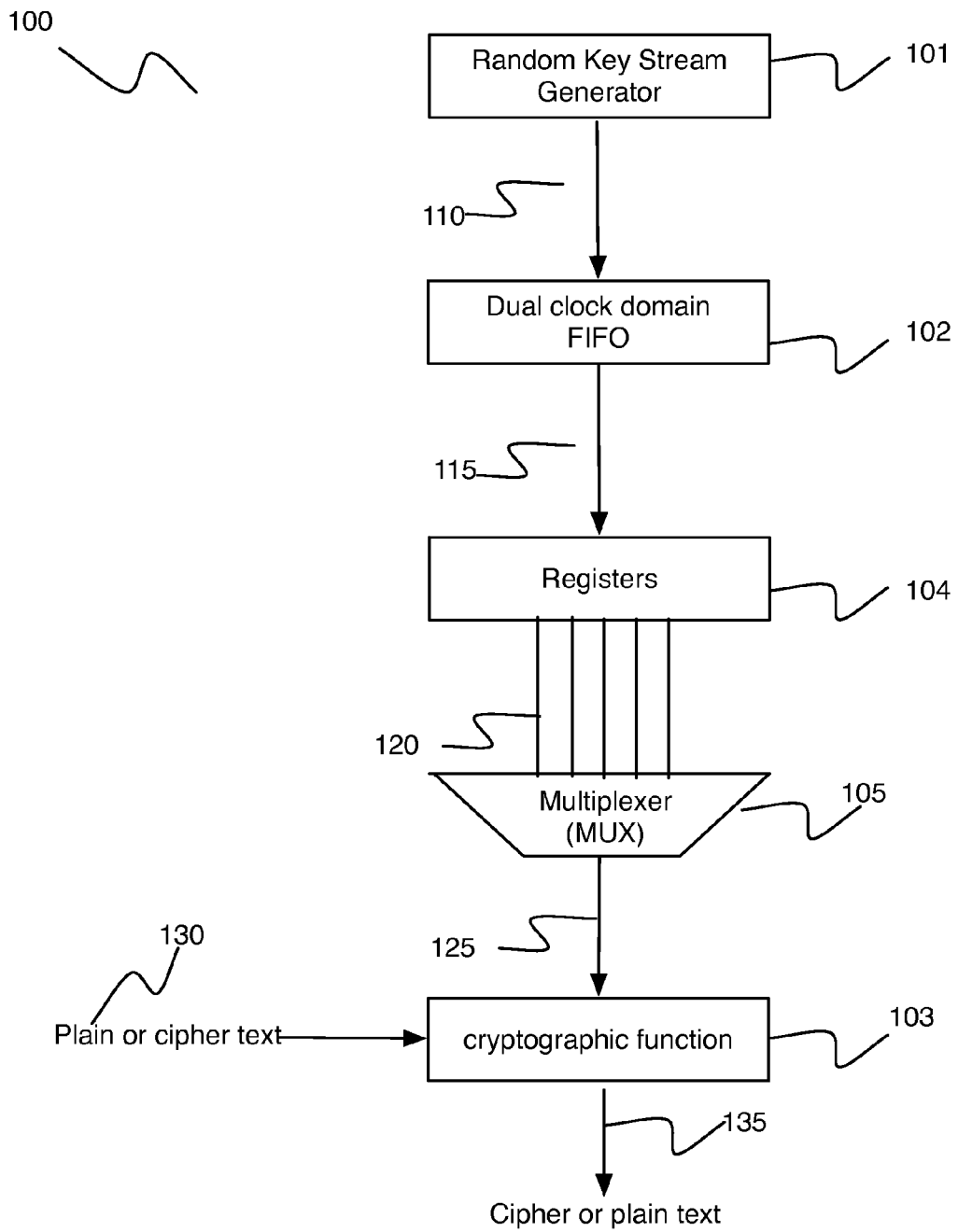
FIG. 1 is a block diagram of a cryptographic system.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Glossary

Cipher Text: Plain data that is encrypted via an encryption process. Cipher text may also be regarded as any data that has gone through a cryptographic process.

Cryptography: Cryptography may be regarded as an algorithm for performing encryption or decryption.

Encryption: In cryptography, encryption is the process by which information is encoded in such a way that only authorized parties can decipher the messages or information.

Decryption: In cryptography, decryption is the process of converting the encrypted information back to its original form.

Cipher: A cryptographic algorithm may be regarded as a cipher.

Key: In cryptography, a key may be regarded as a piece of information that determines the output of a cryptographic algorithm. Without a key, a cryptographic algorithm may not produce any useful result. During encryption, a key specifies the particular transformation of plain text into cipher text. Likewise, during decryption, a key specifies the particular transformation of cipher text into plain text.

Key Size: In cryptography, a key size may be regarded as the size of the key generally measured in bits.

Block Size: In cryptography, a block size may be regarded as the size of the plain text or cipher text measured in bits.

Advanced Encryption Standard (AES): AES was established by the U.S. National Institute of Standards and Technology (NIST) as a standard for the encryption of electronic data. AES has a fixed block size of 128 bits and a key size of 128, 192, or 256 bits.

Dual clock domain First In First Out (FIFO): A dual clock domain FIFO comprises a buffer and two clock domains, one clock domain at the FIFO input interface and a second clock domain at the FIFO output interface.

DESCRIPTION

Referring to FIG. 1, there is provided a cryptographic system 100 that includes a random key stream generator 101, an cryptographic function 103, an elastic storage converting one clock domain to another clock domain, such as for example, a dual clock domain FIFO 102, a block of registers 104, and a multiplexer (MUX) 105. The cryptographic function may perform encryption and/or decryption.

The random key stream generator 101 generates a random key stream (RKS) of, for example, 128 bits 110. The RKS 110 is written into a dual clock domain FIFO 102. The write-side of the FIFO is at the same clock frequency as the RKS. The dual clock domain FIFO output phase, which is in a different clock domain than the input phase, outputs the RKS 115 at a second frequency. The input data width of the dual clock domain FIFO is the same as the output data width of the AES engine. It should be understood that the size of the RKS could be 192 or 256 bits or any other size.

The RKS 115, in the second frequency domain, is then scanned to select narrower data samples in the second frequency domain. This may be done by storing the RKS in the second frequency in registers 104. The registers are scanned to produce smaller blocks of RKS 120 with the second frequency are then passed on to a multiplexer 105, which feeds the smaller block sized RKS of the second frequency 125 to a cryptographic function 103 to encrypt plain text 130 producing cipher text at a second frequency 135 or to decrypt cipher text 130 producing plain text at the second frequency 135.

The first frequency may be lower or higher than the second frequency.

The random key stream generator may use a combination of an Initialization Vector (IV) and counter, wherein the IV generates a RKS of a certain bit size, and the counter generates sequential increment streams of a certain bit size. They both are then concatenated to produce a random key stream. The bit size of the stream that the IV generates may be 64 bits, and the bit size of the counter stream may also be 64 bits to produce a concatenated large block sized RKS of 128 bits.

One RKS generator may feed multiple dual clock domain FIFOs. Alternatively, multiple RKS generator may feed two or more RKS generator to a single or multiple dual clock domain FIFOs. It is to be understood that any combination thereof as would be apparent to one of ordinary skill in the art would lie within the scope of this disclosure.

Figure 2:
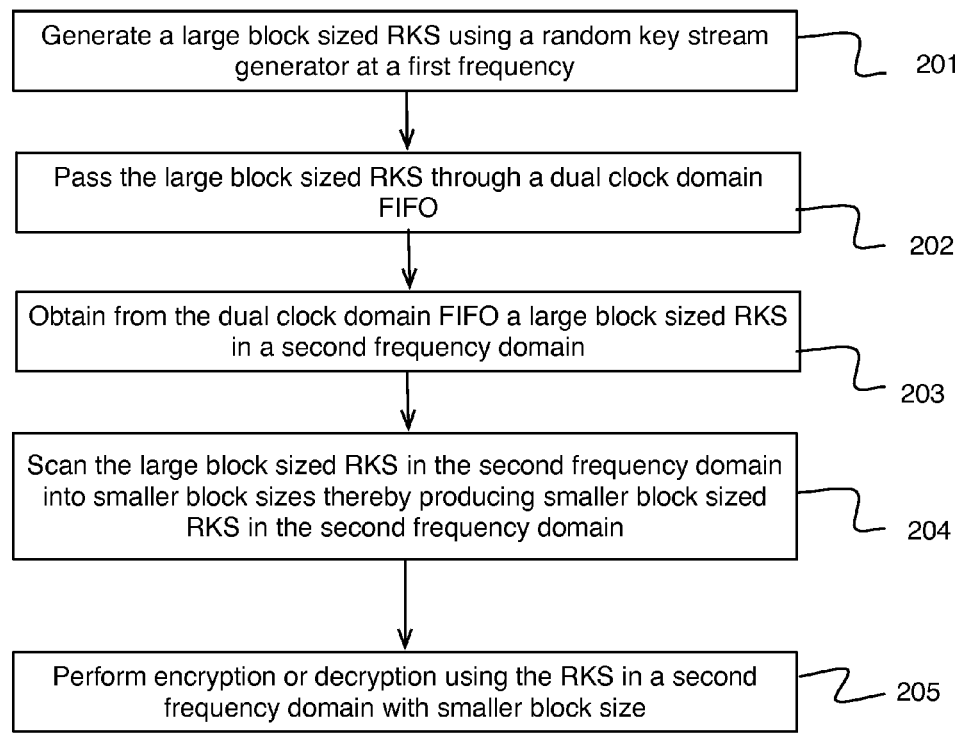
FIG. 2 is a flow chart of a method to generate small blocks of cipher texts with a second frequency.

FIG. 2 is a flow chart of a method for generating small blocks of cipher texts with a desired frequency. The process begins at step 201 by generating a RKS using a random key stream generator. The RKS, which has large blocks and is in a first frequency domain, is then passed through a dual clock domain FIFO in step 202. Then step 203 obtains a large block sized RKS, which is in a second frequency domain, from the output of the dual clock domain FIFO. Step 204 then scans the RKS across in the higher clock domain to produce RKS of smaller block-size. The smaller block RKS are then used in step 205 to perform encryption or decryption or plain text or cipher text respectively.

The embodiments described herein may be used in any AES random key stream application that requires a higher throughput at higher frequencies. Higher throughput may be achieved by smaller block sizes as opposed to large block sizes. To achieve smaller block sizes of higher frequency would require manufacturing of a large area AES, which would in turn take up more physical area in the Integrated Chip (IC). By utilizing existing AES engines, for example 128 bit engines, in combination with a dual clock domain FIFOs and other components as disclosed herein, savings in physical space can be achieved in ICs.

Although the algorithms described above, including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine-readable instructions may alternatively be used. For example, the order of execution of the blocks may be changed, and/or some of the blocks described may be changed, eliminated, or combined.

It should be noted that the algorithms illustrated and discussed herein as having various modules, which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method for performing a cryptographic function on text to generate converted text, the method comprising:
    producing a random key stream having a first block size in a first frequency domain;
    converting the random key stream having a first block size in the first frequency domain to a random key stream having a first block size in a second frequency domain;
    converting the random key stream having the first block size in the second frequency domain into smaller block sizes, thereby producing a smaller block-sized random key stream in the second frequency domain having smaller block sizes; and
    converting the text using the smaller block-sized random key stream of the second frequency domain to produce the converted text;
wherein said converting of the random key stream in the first frequency domain to a random key stream in a second frequency domain is effected by a dual clock domain FIFO.

2. A method for performing a cryptographic function on text to generate converted text, the method comprising:
    producing a random key stream having a first block size in a first frequency domain;
    converting the random key stream having a first block size in the first frequency domain to a random key stream having a first block size in a second frequency domain;
    converting the random key stream having the first block size in the second frequency domain into smaller block sizes, thereby producing a smaller block-sized random key stream in the second frequency domain having smaller block sizes; and
    converting the text using the smaller block-sized random key stream of the second frequency domain to produce the converted text;
wherein converting the random key stream having the first block size in the second frequency domain into smaller block sizes is effected by storing the random key stream in the second frequency domain in a register, and scanning said register to produce the smaller block-size random key stream.

3. A cryptographic system, comprising:
    a random key stream generator generating a random key stream having a first block size in a first frequency domain;
    a dual clock domain FIFO that converts said random key stream in the first frequency domain to a random key stream in a second frequency domain;
    at least one register and at least one multiplexer that convert the random key stream having the first block size in the second frequency domain into smaller block sizes, thereby producing a smaller block-sized random key stream of the second frequency domain; and
    a cryptographic function that converts text using the smaller block-sized random key stream of the second frequency domain into converted text.

4. The cryptographic system of claim 3 wherein said cryptographic function is an encryption function, said text is plain text and said converted text is cipher text.

5. The cryptographic system of claim 3 wherein said cryptographic function is a decryption function, said text is cipher text and said converted text is plain text.

6. The cryptographic system of claim 3 in which the frequency in said first frequency domain is lower than the frequency in said second frequency domain.

7. The cryptographic system of claim 3 which includes small-sized registers that convert the random key stream having the first block size in the second frequency domain into smaller block sizes.

* * * * *